United States Patent
Shiga et al.

(10) Patent No.: US 10,800,673 B2
(45) Date of Patent: Oct. 13, 2020

(54) WATER TREATMENT APPARATUS WITH DRY GAS FLOW

(71) Applicants: METAWATER Co., Ltd., Chiyoda-ku, Tokyo (JP); SENKO RIKEN Co., Ltd., Kobe-shi, Hyogo (JP); NIKKISO CO., LTD., Shibuya-ku, Tokyo (JP)

(72) Inventors: Junichi Shiga, Tokyo (JP); Tsukasa Kusano, Tokyo (JP); Tetsumi Ochi, Tokyo (JP); Shinya Watanabe, Tokyo (JP); Eiichi Tsuga, Kobe (JP); Yusuke Kawakami, Kobe (JP)

(73) Assignees: METAWATER Co., Ltd., Chiyoda-ku, Tokyo (JP); SENKO RIKEN Co., Ltd., Kobe-shi, Hyogo (JP); NIKKISO CO., LTD., Shibuya-ku, Tokyo (JP)

(*) Notice: Subject to any disclaimer, the term of this patent is extended or adjusted under 35 U.S.C. 154(b) by 0 days.

(21) Appl. No.: 16/344,908

(22) PCT Filed: Oct. 11, 2017

(86) PCT No.: PCT/JP2017/036886
§ 371 (c)(1),
(2) Date: Apr. 25, 2019

(87) PCT Pub. No.: WO2018/079265
PCT Pub. Date: May 3, 2018

(65) Prior Publication Data
US 2019/0263681 A1    Aug. 29, 2019

(30) Foreign Application Priority Data
Oct. 27, 2016   (JP) .................. 2016-211002

(51) Int. Cl.
C02F 1/32    (2006.01)

(52) U.S. Cl.
CPC ............... *C02F 1/325* (2013.01); *C02F 1/32* (2013.01); *C02F 2201/3222* (2013.01); *C02F 2201/3227* (2013.01); *C02F 2303/04* (2013.01)

(58) Field of Classification Search
CPC .............. C02F 1/325; C02F 2303/04; C02F 2201/3227; C02F 2201/3222; C02F 1/32
See application file for complete search history.

(56) References Cited

U.S. PATENT DOCUMENTS

| | | | |
|---|---|---|---|
| 6,940,075 B2 * | 9/2005 | Schulz | C02F 1/325 210/150 |
| 2005/0152146 A1 | 7/2005 | Owen et al. | |

(Continued)

FOREIGN PATENT DOCUMENTS

| | | |
|---|---|---|
| CN | 104822395 A | 8/2015 |
| CN | 105164056 A | 12/2015 |

(Continued)

OTHER PUBLICATIONS

Apr. 30, 2019, International Preliminary Report on Patentability issued in the International Patent Application No. PCT/JP2017/036886.

(Continued)

*Primary Examiner* — Brooke Purinton
(74) *Attorney, Agent, or Firm* — Kenja IP Law PC

(57) ABSTRACT

A water treatment apparatus 100 subjects water to be treated to ultraviolet treatment with ultraviolet light emitted from LED elements 31. The water treatment apparatus 100 comprises: a flow channel 10 through which water to be treated flows; an LED element housing chamber 30 located on outside of the flow channel 10, with a window portion 20 formed by a transparent member being interposed therebetween; and a plurality of LED elements 31 arranged in the LED element housing chamber 30, wherein the LED element housing chamber 30 has an inlet 34 and an outlet 35 for (Continued)

dry gas, and light emitting surfaces of the plurality of LED elements 31 are exposed to a space in the LED element housing chamber 30.

5 Claims, 1 Drawing Sheet

(56) References Cited

U.S. PATENT DOCUMENTS

| | | | |
|---|---|---|---|
| 2005/0194607 A1* | 9/2005 | Barnett | F21V 19/0015 257/99 |
| 2012/0132937 A1* | 5/2012 | Chan | H01L 25/0753 257/89 |
| 2014/0263091 A1* | 9/2014 | Carter, III | C02F 1/325 210/748.12 |
| 2015/0129776 A1 | 5/2015 | Boodaghians et al. | |
| 2015/0145540 A1* | 5/2015 | Komatsu | G01R 31/2874 324/750.03 |
| 2015/0155439 A1* | 6/2015 | Cich | H01L 33/60 362/294 |
| 2015/0284266 A1 | 10/2015 | Matsui | |
| 2015/0314024 A1* | 11/2015 | Khan | C02F 1/325 250/435 |
| 2017/0009971 A1* | 1/2017 | Chan | H01L 25/0753 |
| 2017/0126944 A1* | 5/2017 | Jagt | G03B 15/05 |

FOREIGN PATENT DOCUMENTS

| | | | |
|---|---|---|---|
| EP | 2915546 A4 * | 6/2016 | ............ C02F 1/325 |
| JP | H06165982 A | 6/1994 | |
| JP | 2010029821 A | 2/2010 | |
| JP | 2012061413 A | 3/2012 | |
| JP | 2012115715 A | 6/2012 | |
| JP | 2014087544 A | 5/2014 | |
| JP | 2014233646 A | 12/2014 | |
| JP | 2016049519 A | 4/2016 | |
| JP | 2016059875 A | 4/2016 | |
| JP | 2016511138 A | 4/2016 | |
| WO | 2009013507 A1 | 1/2009 | |

OTHER PUBLICATIONS

Nov. 14, 2017, International Search Report issued in the International Patent Application No. PCT/JP2017/036886.
Jan. 23, 2020, Office Action issued by the Intellectual Property Office of Singapore in the corresponding Singaporean Patent Application No. 11201903702Q.
May 28, 2020, Office Action issued by the Taiwan Intellectual Property Office in the corresponding Taiwanese Patent Application No. 106136897.
May 26, 2020, Notification of Reasons for Refusal issued by the Japan Patent Office in the corresponding Japanese Patent Application No. 2016-211002.
May 26, 2020, the Extended European Search Report issued by the European Patent Office in the corresponding European Patent Application No. 17864396.1.

* cited by examiner

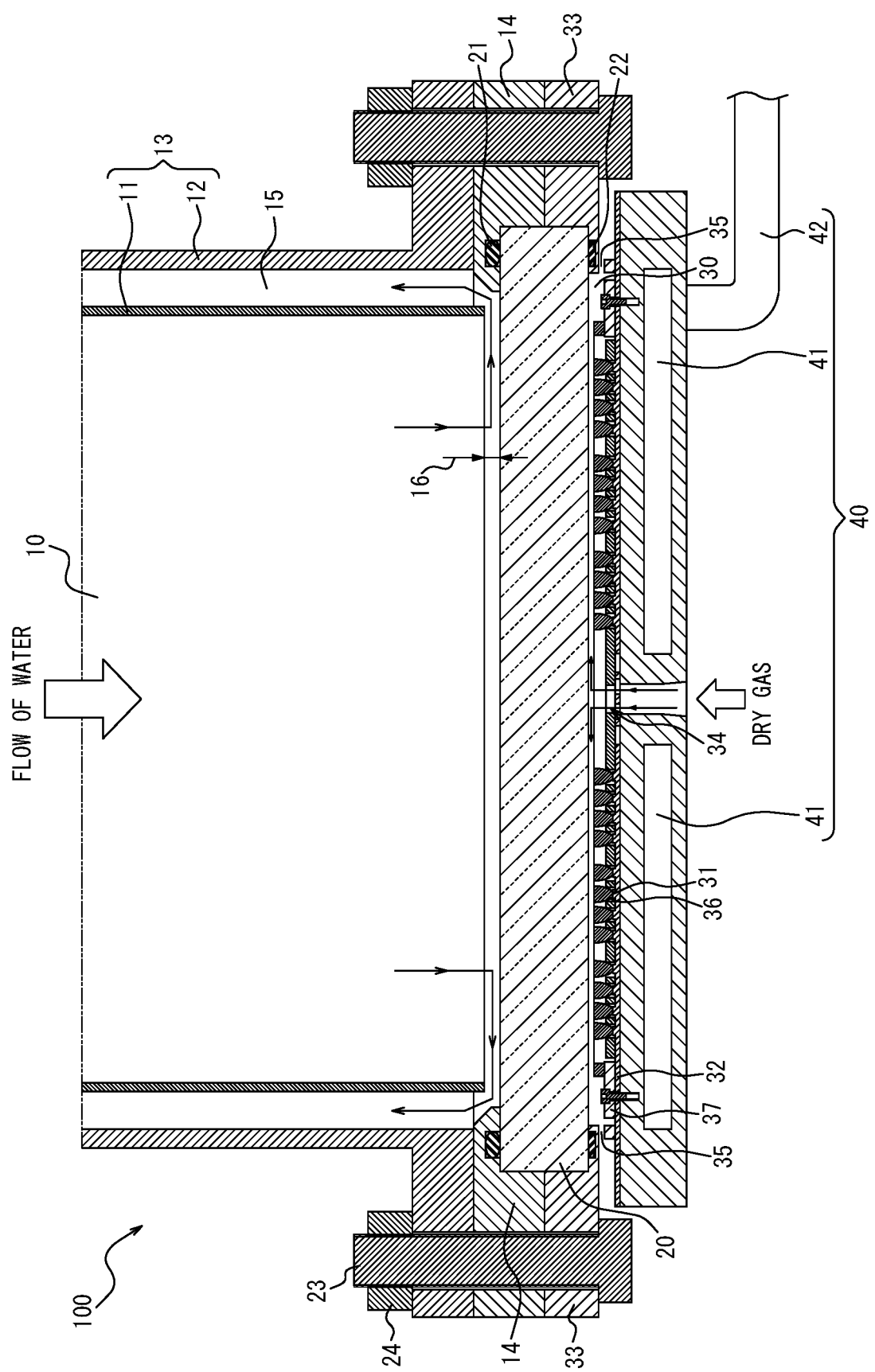

WATER TREATMENT APPARATUS WITH DRY GAS FLOW

TECHNICAL FIELD

The present disclosure relates to a water treatment apparatus, and particularly relates to a water treatment apparatus that subjects water to be treated to ultraviolet treatment with ultraviolet light emitted from light emitting diode (LED) elements.

BACKGROUND

Conventionally, chlorine has been typically used for disinfection treatment in water treatment. In recent years, however, disinfection treatment with chlorine has been found to have room for improvement in disinfection performance. Hence, for sufficient disinfection of water, such as drinking water, to be treated by disinfection treatment, techniques using ultraviolet light have been studied. A typical ultraviolet irradiation apparatus for irradiating water to be treated with ultraviolet light includes a mercury lamp as a light source. With the ultraviolet irradiation apparatus including a mercury lamp, however, the risk of mercury coming into contact with water to be treated due to aging degradation of the apparatus or the like cannot be eliminated.

In view of this, water treatment apparatuses using LEDs as ultraviolet light sources have been developed in recent years (for example, see PTL 1). PTL 1 discloses a water treatment apparatus (hereafter also referred to as a "first conventional water treatment apparatus") in which LED elements as ultraviolet light sources are arranged in a space defined by a transparent member serving as a window portion. PTL 1 also discloses a water treatment apparatus (hereafter also referred to as a "second conventional water treatment apparatus") including a transparent sealing member of glass or the like for protecting LED elements as ultraviolet light sources from water.

CITATION LIST

Patent Literature

PTL 1: JP 2014-233646 A

SUMMARY

Technical Problem

In the first conventional water treatment apparatus, in the case where condensation forms in the space in which the LED elements as ultraviolet light sources are installed, the exposed LED elements may be damaged. In the second conventional water treatment apparatus, the LED elements as ultraviolet light sources are kept from being damaged by water, but the sealing member provided for each LED element causes a decrease in the intensity of ultraviolet light emitted from the LED element, so that the desired irradiation intensity cannot be ensured adequately.

It could therefore be helpful to provide a water treatment apparatus that uses unsealed, i.e. exposed, LED elements as ultraviolet light sources and can prevent the LED elements from being damaged due to condensation while maintaining the intensity of ultraviolet light emitted from the LED elements.

Solution to Problem

As a result of extensive studies, we discovered the following: In a water treatment apparatus that subjects water to be treated to ultraviolet treatment with ultraviolet light emitted from LED elements, by providing an LED element housing chamber that houses LED elements with exposed light emitting surfaces and also causing dry gas to flow into the housing chamber, the LED elements can be prevented from being damaged due to condensation while maintaining the intensity of ultraviolet light emitted from the LED elements.

A water treatment apparatus according to the present disclosure is a water treatment apparatus that subjects water to be treated to ultraviolet treatment with ultraviolet light emitted from LED elements, the water treatment apparatus comprising: a flow channel through which water to be treated flows; an LED element housing chamber located on outside of the flow channel, with a window portion formed by a transparent member being interposed therebetween; and a plurality of LED elements arranged in the LED element housing chamber, wherein the LED element housing chamber has an inlet and an outlet for dry gas, and light emitting surfaces of the plurality of LED elements are exposed to a space in the LED element housing chamber. By arranging the LED elements in the LED element housing chamber in a state in which their light emitting surfaces are exposed and also causing dry air to flow into the LED element housing chamber, the LED elements can be prevented from being damaged due to condensation while maintaining the intensity of ultraviolet light emitted from the LED elements.

Preferably, in the water treatment apparatus according to the present disclosure, an installation density of the plurality of LED elements is 8,000 elements/$m^2$ or more. As a result of the LED installation density being a high density of 8,000 elements/$m^2$ or more, the ultraviolet irradiation intensity for the water to be treated can be further increased to enhance the disinfection effect by the water treatment apparatus.

Preferably, in the water treatment apparatus according to the present disclosure, a light collection plate that surrounds each of the plurality of LED elements is located in the LED element housing chamber, and a gap is provided between the light collection plate and the window portion. The light collection plate collects ultraviolet light from the LED element, thus further increasing the ultraviolet irradiation intensity for the water to be treated. Moreover, by providing a gap between the light collection plate and the window portion so as to keep the light collection plate from being in contact with the window portion, the condensation prevention effect by the dry gas can be further enhanced.

Preferably, the water treatment apparatus according to the present disclosure comprises a cooling device located on a side of the LED element housing chamber opposite to the flow channel. By cooling the LED element housing chamber from the back side, i.e. the side opposite to the flow channel, life reduction and failures of the LED elements can be prevented.

Preferably, the water treatment apparatus according to the present disclosure comprises a seal member between a member forming the flow channel and the transparent member forming the window portion, and a seal member between the transparent member forming the window portion and a member forming the LED element housing chamber. By providing a seal not only on one side of the transparent member forming the window portion but on both sides of the transparent member, the reliability of the water treatment apparatus can be improved.

Advantageous Effect

The water treatment apparatus according to the present disclosure can prevent the LED elements from being damaged due to condensation while maintaining the intensity of ultraviolet light emitted from the LED elements.

BRIEF DESCRIPTION OF THE DRAWINGS

In the accompanying drawings:

FIG. 1 is a schematic diagram of a water treatment apparatus according to one of the disclosed embodiments.

DETAILED DESCRIPTION

An embodiment of a water treatment apparatus according to the present disclosure will be described in detail below, with reference to drawings. For example, the water treatment apparatus according to the present disclosure can be installed in large-scale facilities such as water purification plants, small-scale water dispensers, sewage treatment plants, and ultrapure water production equipment, and can be used for drinking water disinfection treatment.

(Water Treatment Apparatus)

FIG. 1 is a schematic diagram of a water treatment apparatus according to one of the disclosed embodiments. A water treatment apparatus 100 illustrated in FIG. 1 is a water treatment apparatus that subjects water to be treated to ultraviolet treatment with ultraviolet light emitted from LED elements. The water treatment apparatus 100 includes: a flow channel 10 through which water to be treated flows; an LED element housing chamber 30 located on the outside of the flow channel 10 with a window portion 20 being interposed therebetween; and a plurality of LED elements 31 arranged in the LED element housing chamber 30. The LED element housing chamber 30 has an inlet 34 and an outlet 35 for dry gas. The light emitting surfaces of the LED elements 31 are exposed to the space in the LED element housing chamber 30. The water treatment apparatus 100 irradiates the water to be treated flowing through the flow channel 10 with ultraviolet light emitted from the LED elements 31 in the LED element housing chamber 30, to perform disinfection treatment. The resultant treated water may be, for example, delivered to any type of facility for drinking water supply, as drinking water.

Each functional unit in the water treatment apparatus 100 will be described in more detail below. In the following description, the side on which the water to be treated flows into the water treatment apparatus 100 is referred to as "upstream side", and the side on which the treated water flows out of the water treatment apparatus 100 is referred to as "downstream side".

The flow channel 10 may be formed in a double pipe structure 13 including an inner pipe 11 and an outer pipe 12 that may be, for example, SUS pipes. The inner pipe 11 is surrounded by the outer pipe 12 located on the outer circumferential side of the inner pipe 11. The outer pipe 12 has an outlet (not illustrated) for the treated water at, for example, its outer circumference surface, without being limited thereto. A gap is provided between the edge of the inner pipe 11 on one side in the axial direction and the window portion 20. Such a gap may be defined by an optional displacement prevention member 14. The displacement prevention member 14 is not limited as long as it can define a gap 16 between the edge of the inner pipe 11 on one side in the axial direction and the window portion 20, and may be formed by, for example, a flange, a spigot joint type flange, and/or a lock pin. Thus, the displacement prevention member 14 illustrated in FIG. 1 may be a spigot joint type flange having a spigot joint type projection that may hold the inner pipe 11 at a predetermined position and define the gap between the inner pipe 11 and the window portion 20, although not illustrated in detail. The displacement prevention member 14 is, however, not limited to a spigot joint type flange, and may be, for example, a normal flange without a spigot joint type projection. In this case, for example, the gap between the inner pipe and the window portion can be defined by a structure in which the inner pipe is pressed downward in the axial direction and, at a position at which the inner diameter of the tapered inner circumferential surface of the displacement prevention member matches the outer diameter of the inner pipe, held so as not to move further downward in the axial direction.

The end of the outer pipe 12 on the window portion 20 side in the axial direction may have a flange. The displacement prevention member 14 illustrated as a spigot joint type flange and the flange of the end of the outer pipe 12 are fixed to each other, and extend beyond the inner pipe 11 to one side in the axial direction. In particular, the displacement prevention member 14 holds the window portion 20, and is connected to the window portion 20 liquid-tightly. Although the displacement prevention member 14 and the outer pipe 12 are illustrated as separate members in FIG. 1, they may be combined as one member. That is, the outer pipe 12 may surround the inner pipe 11 and also have a structure of defining the gap 16 between the edge of the inner pipe 11 on one side in the axial direction and the window portion 20.

The inner pipe 11, the outer pipe 12, and the optional displacement prevention member 14 form the flow channel 10 and a treated water flow channel 15 into which the treated water that has passed through the flow channel 10 and has been treated with ultraviolet light from the window portion 20 flows.

The flow of water that has passed through the flow channel 10 and collided with the window portion 20 is irradiated with ultraviolet light from the LED element housing chamber 30 via the window portion 20 while flowing along the surface of the window portion 20. The water to be treated that has flown into the water treatment apparatus 100 and passed through the flow channel 10 thus undergoes ultraviolet treatment and turns into treated water. The treated water flows along the surface of the window portion 20 toward the inner wall surfaces of the inner pipe 11, the outer pipe 12, and the displacement prevention member 14, thus passing through the gap 16 and reaching the treated water flow channel 15 defined by the inner pipe 11, the outer pipe 12, and the displacement prevention member 14. The treated water then passes through the treated water flow channel 15, and flows out of the water treatment apparatus 100 through the outlet at the outer circumference surface of the outer pipe 12.

The window portion 20 is, for example, desirably made of a transparent material having high ultraviolet light transmittance. For example, the window portion 20 is preferably formed by a transparent member obtained by forming a transparent material such as quartz glass ($SiO_2$), sapphire glass ($Al_2O_3$), or fluorine-based resin in plate shape. In terms of durability, transparency, and the like, the transparent material is preferably quartz glass. The window portion 20 is located on one side in the axial direction (the lower side in FIG. 1) of the double pipe structure 13 composed of the inner pipe 11 and the outer pipe 12. The LED element housing chamber 30 is located on the outside of the flow channel 10 with the window portion 20 being interposed therebetween.

The LED element housing chamber 30 contains the plurality of LED elements 31. These LED elements 31 have their light emitting surfaces exposed to the space in the LED element housing chamber 30. Herein, the expression "a light emitting surface of an LED element is exposed" means that a light emitting surface formed by placing an epitaxial layer and the like of an LED structure on a substrate such as a sapphire substrate is not covered by a structural part, such as a lens and/or a sealing member, not directly contributing to light emission. Ultraviolet light emitted from the plurality of LED elements 31 whose light emitting surfaces are exposed to the space in the LED element housing chamber 30 is applied to the water to be treated flowing in the inner pipe 11.

Each LED element 31 may be, for example, an element that emits ultraviolet light of a wavelength of 200 nm or more and more preferably 240 nm or more and 300 nm or less and more preferably 285 nm or less. Ultraviolet light in such wavelength ranges particularly has high disinfection power.

The plurality of LED elements 31 may be, for example, arranged in a state of being fixed to an LED substrate 32, without being limited thereto. The installation density of the plurality of LED elements 31 in the LED element housing chamber 30 is preferably 8,000 elements/m$^2$ or more. By arranging the LED elements in the LED element housing chamber 30 at a high density of 8,000 elements/m$^2$ or more, the ultraviolet irradiation intensity can be increased, and the disinfection performance of the water treatment apparatus 100 can be improved. In the present disclosure, such high density arrangement of LED elements is enabled as a result of employing a structure of arranging the plurality of LED elements 31 with their light emitting surfaces being exposed to the space in the LED element housing chamber 30.

The LED element housing chamber 30 is surrounded by an LED element housing chamber defining flange 33, the window portion 20, and the LED substrate 32. The LED substrate 32 has a dry gas inlet 34 through which dry gas flows into the LED element housing chamber 30. The LED element housing chamber defining flange 33 has at least one dry gas outlet 35 and preferably has a plurality of dry gas outlets 35, at its wall portion defining the LED element housing chamber 30 in the axial direction of the water treatment apparatus 100.

Herein, "dry gas" denotes air whose dew-point temperature is not higher than the dew-point temperature of ambient air of the installation environment of the water treatment apparatus 100. More specifically, the dry gas may be air having a dew point of 0° C. or less. The temperature of the dry gas may be room temperature (JIS Z 8703), without being limited thereto. The dry gas that has flown into the LED element housing chamber 30 through the dry gas inlet 34 collides with the window portion 20, flows along the window portion 20, and is eventually released from the dry gas outlet(s) 35. By circulating the dry gas in the LED element housing chamber 30 in this way, the LED elements can be prevented from being damaged due to condensation.

Preferably, a light collection plate 36 that surrounds each LED element 31 is located in the LED element housing chamber 30, and a gap is provided between the light collection plate 36 and the window portion 20. If each LED element 31 is provided with the light collection plate 36 such as a reflector, ultraviolet light emitted from the LED element 31 can be collected to further increase the ultraviolet irradiation intensity for the water to be treated. The shape of the light collection plate 36 can be freely optimized based on the distance from the window portion 20, the area and thickness of the window portion 20, and the like. The light collection plate 36 such as a reflector may be held via a light collection plate holding member 37 such as a reflector mount.

Preferably, a gap is provided between the top part of the light collection plate 36 in the axial direction and the window portion 20. With a gap between the light collection plate 36 and the window portion 20, the fluidity of the dry gas in the LED element housing chamber 30 can be increased to further enhance the condensation prevention effect by the dry gas. The size of the gap can be set freely, but is preferably 0.5 mm or more and 1.0 mm or less. If the size of the gap is 0.5 mm or more, the light collection effect by the light collection plate 36 can be ensured adequately. If the size of the gap is 1.0 mm or less, the condensation prevention effect by the dry gas can be enhanced adequately.

The transparent member forming the window portion 20 is held from both sides in the axial direction by the displacement prevention member 14 and the LED element housing chamber defining flange 33. The displacement prevention member 14, the LED element housing chamber defining flange 33, and the flange at the end of the outer pipe 12 may be fixed to each other. The fixing method is not limited, and may be, for example, a typical fixing method using bolts 23 and nuts 24 illustrated in FIG. 1.

Preferably, a first seal member 21 is located between the displacement prevention member 14 and the transparent member forming the window portion 20, and a second seal member 22 is located between the transparent member forming the window portion 20 and the LED element housing chamber defining flange 33. The first seal member 21 is pressed from above and below in the axial direction by the displacement prevention member 14 and the window portion 20, to enhance the sealing connection between the displacement prevention member 14 and the window portion 20. The second seal member 22 is pressed from above and below in the axial direction by the window portion 20 and the LED element housing chamber defining flange 33, to enhance the sealing connection between the window portion 20 and the LED element housing chamber defining flange 33. The first seal member 21 and the second seal member 22 are each a member capable of, as a result of being interposed and compressed between connection objects, ensuring the sealing of the pipe members as the connection objects. More specifically, the first seal member 21 and the second seal member 22 may be, for example, packing or gaskets. The seal members such as packing or gaskets may be members containing an elastic material such as rubber.

By sealing the transparent member not only on the flow channel 10 side but on both sides, the reliability of the water treatment apparatus 100 can be improved. In the case where the water to be treated leaks into the LED element housing chamber 30, the water treatment apparatus 100 fails. The stringent sealing structure described above can, however, prevent water from entering the LED element housing chamber 30.

The water treatment apparatus 100 preferably includes a cooling device 40 on the side of the LED element housing chamber 30 opposite to the flow channel 10. For example, the cooling device 40 may be composed of a cooling chamber 41 provided in a cooling plate and a cooling water line 42 through which cooling water flows into the cooling chamber. The water treatment apparatus 100 has a feature of causing dry gas to flow into the LED element housing chamber 30, as mentioned above. Accordingly, in the water treatment apparatus 100, it is impossible to cool the LED elements 31 by using the water to be treated flowing through the flow channel 10. Moreover, the light emitting surfaces of the LED elements 31 are exposed to the space in the LED element housing chamber 30 without being protected by lenses, sealing members, or the like in the water treatment apparatus 100. Hence, in the water treatment apparatus 100, it is also impossible to cool the LED elements 31 by introducing cooling water directly into the LED element housing chamber 30. In view of this, in the present disclosure, the cooling device 40 is provided on the side of the LED element housing chamber 30 opposite to the flow channel 10, with it being possible to cool the LED elements 31. By cooling the LED elements 31 in this way, the life of the LED elements 31 can be increased, and failures of the LED elements 31 can be prevented.

Although not illustrated, the cooling water line 42 may be connected to the outer pipe 12, to supply the treated water to the cooling chamber 41 as the cooling water. The treated water as the cooling water circulated in the cooling chamber 41 may meet the treated water flowing out of the outer pipe 12, through a cooling water drainage line (not illustrated). If the cooling water line 42 is connected to the outer pipe 12, the LED elements 31 can be cooled without installing a separate power source for supplying water to the cooling chamber 41. With such a structure, the water treatment efficiency of the water treatment apparatus 100 can be further improved.

While the water treatment apparatus according to the present disclosure has been described above by way of an embodiment, the water treatment apparatus according to the present disclosure is not limited to the foregoing embodiment. The water treatment apparatus according to the present disclosure can be subjected to changes as appropriate.

Specifically, for example, although the foregoing embodiment describes the case where the cooling chamber 41 is a void in the cooling plate which is a plate-like member supporting the LED substrate 32, the cooling chamber may be, for example, an inner space of a pipe provided in any of various shapes such as spiral and zigzag. The cooling chamber having such a structure can contribute to higher LED element cooling efficiency.

Although the foregoing embodiment describes the structure in which the flow channel 10 is formed by the inner pipe 11, the outer pipe 12, and the optional displacement prevention member 14, the window portion 20 is located at one end of these pipes and member in the axial direction, and the LED element housing chamber 30 is located on the side of the window portion 20 opposite to the flow channel 10, the water treatment apparatus according to the present disclosure may have a structure in which the window portion is located along the flow channel, e.g. in a pipe forming the flow channel, and ultraviolet light from the LED elements is applied via the window portion.

INDUSTRIAL APPLICABILITY

The water treatment apparatus according to the present disclosure can prevent the LED elements from being damaged due to condensation while maintaining the intensity of ultraviolet light emitted from the LED elements.

REFERENCE SIGNS LIST 10 flow channel
11 inner pipe
12 outer pipe
13 double pipe structure
14 displacement prevention member
15 treated water flow channel
16 gap
20 window portion
21 first seal member
22 second seal member
23 bolt
24 nut
30 LED element housing chamber
31 LED element
32 LED substrate
33 LED element housing chamber defining flange
34 dry gas inlet
35 dry gas outlet
36 light collection plate
37 light collection plate holding member
40 cooling device
41 cooling chamber
42 cooling water line
100 water treatment apparatus

The invention claimed is:

1. A water treatment apparatus that subjects water to be treated to ultraviolet treatment with ultraviolet light emitted from LED elements, the water treatment apparatus comprising:
   a flow channel through which water to be treated flows;
   an LED element housing chamber located on an outside of the flow channel, with a window portion formed by a transparent member being interposed therebetween;
   a plurality of LED elements arranged in the LED element housing chamber; and a plurality of light collection plates each corresponding to the respective LED elements and arranged in the LED element housing chamber,
   wherein the LED element housing chamber has an inlet and an outlet for dry gas,
   light emitting surfaces of the plurality of LED elements are not covered by a structural part not directly contributing to light emission and the light emitting surfaces are exposed to a space in the LED element housing chamber, and
   a gap is provided between the plurality of light collection plates and the window portion so as to allow a flow of the dry gas to pass through.

2. The water treatment apparatus according to claim 1, wherein an installation density of the plurality of LED elements is 8,000 elements/m$^2$ or more.

3. The water treatment apparatus according to claim 1, comprising
   a cooling device located on a side of the LED element housing chamber opposite to the flow channel.

4. The water treatment apparatus according to claim 1, comprising
   a seal member between a member forming the flow channel and the transparent member forming the window portion, and a seal member between the transparent member forming the window portion and a member forming the LED element housing chamber.

5. The water treatment apparatus according to claim 1, comprising an inner pipe forming the flow channel and a displacement prevention member defining a gap between the edge of the inner pipe and the window portion, wherein the displacement prevention member also forms the flow channel with the inner pipe.

* * * * *